(12) United States Patent
Thaker et al.

(10) Patent No.: US 7,080,265 B2
(45) Date of Patent: Jul. 18, 2006

(54) VOLTAGE SET POINT CONTROL SCHEME

(75) Inventors: Mahesh Natverlal Thaker, Moorpark, CA (US); Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 368 days.

(21) Appl. No.: 10/388,829

(22) Filed: Mar. 14, 2003

(65) Prior Publication Data
US 2004/0179382 A1   Sep. 16, 2004

(51) Int. Cl.
*G06F 1/26* (2006.01)
(52) U.S. Cl. .......................... 713/300; 363/74
(58) Field of Classification Search ................ 713/300, 713/310, 320, 321; 323/234, 241, 304; 363/15, 74
See application file for complete search history.

(56) References Cited

U.S. PATENT DOCUMENTS

| | | | |
|---|---|---|---|
| 3,660,672 A | 5/1972 | Berger et al. |
| 4,194,147 A | 3/1980 | Payne et al. |
| 4,538,073 A | 8/1985 | Freige et al. |
| 4,538,101 A | 8/1985 | Shimpo et al. |
| 4,616,142 A | 10/1986 | Upadhyay et al. |
| 4,622,627 A | 11/1986 | Rodriguez et al. |
| 4,654,769 A | 3/1987 | Middlebrook |
| 5,053,920 A | 10/1991 | Staffiere et al. |
| 5,073,848 A | 12/1991 | Steigerwald et al. |
| 5,079,498 A | 1/1992 | Cleasby et al. |
| 5,229,699 A | 7/1993 | Chu et al. |
| 5,349,523 A | 9/1994 | Inou et al. |
| 5,377,090 A | 12/1994 | Steigerwald |
| 5,481,140 A | 1/1996 | Maruyama et al. |
| 5,532,577 A | 7/1996 | Doluca |
| 5,627,460 A | 5/1997 | Bazinet et al. |
| 5,727,208 A | 3/1998 | Brown |
| 5,752,047 A | 5/1998 | Darty et al. |
| 5,815,018 A | 9/1998 | Soborski |
| 5,883,797 A | 3/1999 | Amaro et al. |
| 5,892,933 A | 4/1999 | Voltz |
| 5,905,370 A | 5/1999 | Bryson |
| 5,917,719 A | 6/1999 | Hoffman et al. |

(Continued)

FOREIGN PATENT DOCUMENTS

EP         0660487        6/1995

(Continued)

OTHER PUBLICATIONS

33702 Microprocessor Power Supply (3.0A), Analog Products MC33702 Fact Sheet; Motorola/Digital dna/ Power Management Switching; pp. 1-4.

(Continued)

*Primary Examiner*—Thuan Du
(74) *Attorney, Agent, or Firm*—O'Melveny & Myers LLP

(57) ABSTRACT

A system and method is provided for determining a voltage output of a programmable power converter based on programming voltage data received from one of a variety of alternate sources. Specifically, in one embodiment of the present invention, a control unit is adapted to monitor a digital data serial interface, a digital data parallel interface, and an analog data interface to determine whether programming voltage data has been received. If programming voltage data has been received, the data is used to determine an output voltage for the programmable power converter. If more than one set of programming voltage data has been received, a determination is made as to which set of data takes priority. The selected set of data is then used to determine an output voltage for the programmable power converter.

20 Claims, 3 Drawing Sheets

U.S. PATENT DOCUMENTS

| | | | |
|---|---|---|---|
| 5,929,618 | A | 7/1999 | Boylan et al. |
| 5,943,227 | A | 8/1999 | Bryson et al. |
| 5,946,495 | A | 8/1999 | Scholhamer et al. |
| 5,990,669 | A | 11/1999 | Brown |
| 6,057,607 | A | 5/2000 | Rader, III et al. |
| 6,115,441 | A | 9/2000 | Douglass et al. |
| 6,157,182 | A | 12/2000 | Tanaka et al. |
| 6,163,143 | A | 12/2000 | Shimamori |
| 6,163,178 | A | 12/2000 | Stark et al. |
| 6,191,566 | B1 | 2/2001 | Petricek et al. |
| 6,194,883 | B1 | 2/2001 | Shimamori |
| 6,208,127 | B1 * | 3/2001 | Doluca ............... 323/349 |
| 6,211,579 | B1 | 4/2001 | Blair |
| 6,262,900 | B1 | 7/2001 | Suntio |
| 6,385,024 | B1 | 5/2002 | Olson |
| 6,392,577 | B1 | 5/2002 | Swanson et al. |
| 6,396,169 | B1 | 5/2002 | Voegeli et al. |
| 6,396,250 | B1 | 5/2002 | Bridge |
| 6,421,259 | B1 | 7/2002 | Brooks et al. |
| 6,429,630 | B1 | 8/2002 | Pohlman et al. |
| 6,788,033 | B1 | 9/2004 | Vinciarelli |
| 6,829,547 | B1 * | 12/2004 | Law et al. ............... 702/64 |
| 2002/0073347 | A1 | 6/2002 | Zafarana et al. |
| 2002/0105227 | A1 | 8/2002 | Nerone et al. |
| 2003/0122429 | A1 | 7/2003 | Zhang et al. |
| 2003/0142513 | A1 | 7/2003 | Vinciarelli |
| 2003/0201761 | A1 | 10/2003 | Harris |
| 2004/0090219 | A1 | 5/2004 | Chapuis |
| 2004/0093533 | A1 | 5/2004 | Chapuis et al. |
| 2004/0123164 | A1 | 6/2004 | Chapuis et al. |
| 2004/0123167 | A1 | 6/2004 | Chapuis |
| 2004/0135560 | A1 | 7/2004 | Kernahan et al. |
| 2004/0155640 | A1 | 8/2004 | Sutardja et al. |
| 2004/0178780 | A1 | 9/2004 | Chapuis |
| 2004/0246754 | A1 | 12/2004 | Chapuis |
| 2005/0093594 | A1 | 5/2005 | Kim et al. |

FOREIGN PATENT DOCUMENTS

| | | |
|---|---|---|
| EP | 0875994 | 11/1998 |
| EP | 0997825 | 5/2000 |
| SU | 1814177 A1 * | 5/1993 |
| WO | WO93/19415 | 9/1993 |
| WO | WO02/31951 | 4/2002 |
| WO | WO02/50690 | 6/2002 |

OTHER PUBLICATIONS

"Motorola Switch Mode Power Supply With Multiple Linear Regulators And High Speed CAN Transceiver", Motorola, Inc. 2002; digital dna; Analog Marketing; Rev. 2.5, Nov. 2002; 33394; Multi-Output Power Supply Semiconductor Technical Data.

"Power Management Solutions For Networking Applications"; Presented by Luc Darmon, Smart Networks Developer Forum 2003—Jun. 4-6 Euro-Disney Paris, France; Motorola digital dna; www.motorola.com/sndf; pp. 1-26.

Preliminary Information 1.5 A Switch-Mode Power Supply With Linear Regulator 33701; Power Supply Integrated Circuit; Motorola Semiconductor Technical Data; Analog Marketing MC33701/D Rev. 1.0, May 2003; Motorola digital dna; pp. 1-24.

"Electronic Products" Power Supply Special, The Engineer's Magazine of Product Technology, A Hearst Business Publication, vol. 37, No. 10, Mar. 1995, 4 pages.

"KEKB Power Supply Interface Controller Module" by A. Akiyama, T. Nakamura, M. Yoshida, T. Kubo, N. Yamamoto and T. Katoh. KEK, High Energy Accelerator Research Organization, 1-1 Ohio, Tsukuba 305, Japan International Conference on Accelerator and Large Experimental Physics and Control Systems, 1997, Beijing, China, 4 pages.

"Magnet Power Supply Control System in KEKB Accelerators" by T.T. Nakamura, A. Akiyama, T. Katoh, Ta. Kubo, N. Yamamoto, M. Yoshida. KEK, Tsukuba, Japan International Conference on Accelerator and Large Experimental Physics Control Systems, 1999, Trieste, Italy, pp. 406-408.

"System Management Bus Specification" Smart Battery System Specifications, Revision 1.1, Dec. 11, 1998 Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG, All rights reserved, 39 pages.

"The 12C-Bus Specification" Version 2.1, Jan. 2000, Document Order No. 9398 393 40011, pp. 1-46.

"Quantization Resolution and Limit Cycling in Digitally Controlled PWM Converters" by Angel V. Peterchev and A.V. Sanders. Electrical Engineering and Computer Science; UC Berkley; Power Electronics Specialists Conference, 2001.PESC, vol. 2, Jun. 17-21, 2001, pp. 465-471; XP002274573.

* cited by examiner

VOLTAGE SET POINT CONTROL SCHEME

BACKGROUND OF THE INVENTION

1. Field of the Invention

The present invention relates generally to power regulation systems and, more particularly, to a system and method of determining a voltage output based on programming voltage data received from at least one of a variety of alternate sources.

2. Background of the Invention

Power converters, which are also referred to as Point-of-load ("POL") regulators, voltage regulators or DC/DC converters, are commonly used in conjunction with electronic circuits. This is because the voltage/current requirements of electronic circuits typically differ from the voltage that is readily available or the current that can practically be delivered. For example, some electronic devices only include a single voltage input (e.g., 12 v), but require different voltages for circuits contained within (e.g., 3 v, 5 v, 9 v, etc.). A common solution is to design multiple power converters within the device for converting the single input voltage into multiple voltage levels.

Similarly, some electronic devices include circuits that require low voltage (e.g., 1 v), high current (e.g., 100 A) power supplies. This is problematic in that it is impractical to deliver high current at low voltages over a relatively long distance and still meet desired regulation performances. A common solution is to use a high voltage, low current power supply and design a power converter near the internal circuit. This allows low current to travel throughout the device, and provides a low voltage, high current power supply (i.e., using the power converter) near the internal circuit.

Traditionally, power converters operate in conjunction with a power supply controller ("controller") that activates, programs, and monitors the power converters. Specifically, the controller uses a multi-connection parallel bus (e.g., a six bit parallel bus) to activate and program each power converter. The parallel bus includes an enable/disable bit for turning the power converter on and off and five VID code bits for programming the output voltage of the power converter. The controller further uses additional connections (e.g., three wires) to monitor the voltage/current that is being delivered by each power converter.

The drawback with this type of power converter is that it is only configured to be programmed via a six bit parallel bus. Not only does this limit the type of application in which it can be used, but its adds complexity and size to the overall electronic device. For example, eighteen connections (i.e., eighteen wires or traces) are needed to program or operate three power converters. Thus, it would be advantageous to have a system and method of programming a power converter that overcame these disadvantages.

SUMMARY OF THE INVENTION

The present invention provides a system and method of determining a voltage output of a programmable power converter based on programming voltage data received from at least one of a variety of alternate sources. Embodiments of the present invention operate in accordance with a programmable power converter including a digital data serial interface ("serial interface"), a digital data parallel interface ("parallel interface"), an analog data interface ("analog interface"), a control unit, and an output voltage builder. In one embodiment of the present invention, the programmable power converter further includes a storage device for storing digital data. In another embodiment of the present invention, the control unit further includes an analog circuit and a processor.

In a preferred embodiment of the present invention, the control unit (or the processor) monitors the serial, parallel and analog interfaces to determine whether programming voltage data has been received. If more than one set of programming voltage data has been received, the control unit determines which set of data takes priority (or is more relevant). For example, in one embodiment of the present invention, data received by the serial interface takes priority over data received by the parallel and analog interface. In another embodiment of the present invention, data received by the parallel interface takes priority over data received by the analog interface. The selected set of programming voltage data is then used (at least in part) to determine an output voltage for the programmable power converter.

In one embodiment of the present invention, at least one of the interfaces includes a communication bus (or wire(s)) capable of receiving, and transmitting to the control unit, a particular format of data. In another embodiment of the present invention, the interface further includes at least one additional component capable of performing a particular operation or function on the received data and providing data (e.g., the resulting data) in response thereto to the control unit. In another embodiment of the present invention, the programming voltage data is received from a programming apparatus (e.g., a resistor network, a plurality of fixed digital values, a processor, etc.).

A more complete understanding of the system and method of determining a voltage output of a programmable power converter will be afforded to those skilled in the art, as well as a realization of additional advantages and objects thereof, by a consideration of the following detailed description of the preferred embodiment. References will be made to the appended sheets of drawings which will first be described briefly.

DETAILED DESCRIPTION

The present invention provides a system and method of determining a voltage output of a programmable power converter based on programming voltage data received from at least one of a variety of alternate sources. In the detailed description that follows, like element numerals are used to describe like elements illustrated in one or more figures.

Figure 1:
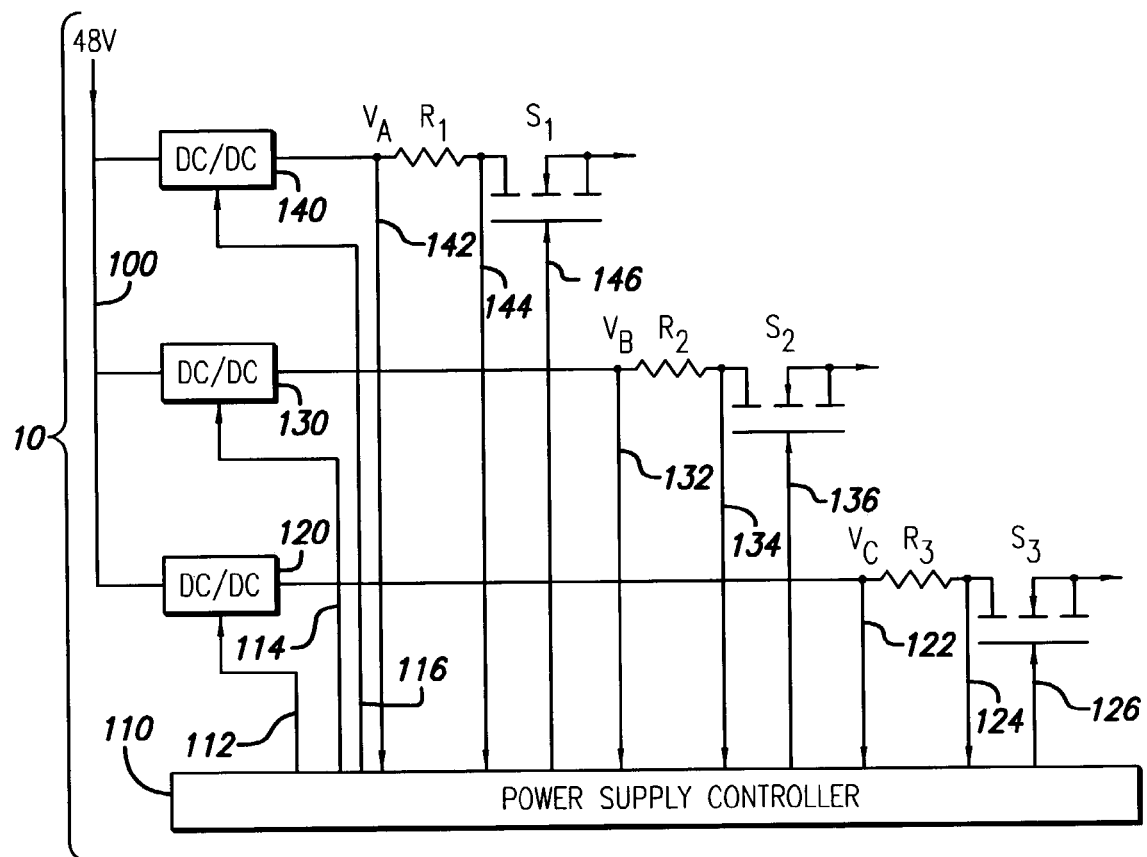
FIG. 1 depicts a prior art power converter system.

FIG. 1 illustrates a prior art power converter system 10 where a power supply controller ("controller") 110 communicates with a plurality of DC/DC power converters (i.e., 120, 130 and 140), also referred to as voltage regulators or point-of-load ("POL") regulators, via a plurality of six bit parallel buses (i.e., 112, 114 and 116) and a plurality of three-wire output connections (i.e., 122–126, 132–136, and 142–146). More particularly, each six bit parallel bus includes an enable/disable bit and five VID code bits, and each three-wire output connection includes a voltage monitoring line (i.e., 122, 132 and 142), a current monitoring line (i.e., 124, 134 and 144), and a switch enable line (i.e., 126, 136, 146).

As shown in FIG. 1, the controller 110 controls the output voltage of each DC/DC power converter by activating, programming, and monitoring the converter via the six bit parallel bus and the three-wire output connection. For example, the controller 110 provides programming voltage data (e.g., output voltage set-point data) to the DC/DC power converter 140 via the VID code portion of the six bit parallel bus 116. The controller 110 then activates the DC/DC power converter 140 via the enable/disable portion of the six bit parallel bus 116. Once activated, the DC/DC power converter 140 converts the voltage provided via the power supply 100 (e.g., 48 v) into an output voltage $V_A$—the magnitude of the output voltage $V_A$ being based on the programming voltage data provided via the VID code portion of the six bit parallel bus 116. The controller 110 then verifies that the output voltage $V_A$ is the desired voltage by measuring the voltage via the voltage monitoring line 142. If the output voltage $V_A$ is acceptable, it is provided to the load (not shown) by activating the switch $S_1$ via the switch enable line 146. The controller 110 can then continuously monitor the output voltage and the output current by measuring the voltage via the voltage monitoring line 142 and measuring the voltage drop over the sense resistor $R_1$ (i.e., the voltage differential between the current monitoring line 144 and the voltage monitoring line 142), respectively. The controller 110 communicates (i.e., programs, activates, monitors) with the remaining DC/DC power converters 120, 130 in the same manner.

The problem with the DC/DC power converters depicted in FIG. 1 (e.g., 140) is that they are only configured to be programmed via a six-bit parallel bus (e.g., 116). Not only does this limit the type of application in which the power converters can be used, but it adds complexity and size to the overall electronic device (not shown) by requiring a six bit parallel bus (i.e., 112, 114 and 116) to operate each power converter. In other words, the controller 110 utilizes eighteen connections (i.e., eighteen wires or traces) in order to communicate with three DC/DC power converters (i.e., 120, 130 and 140).

Figure 2:
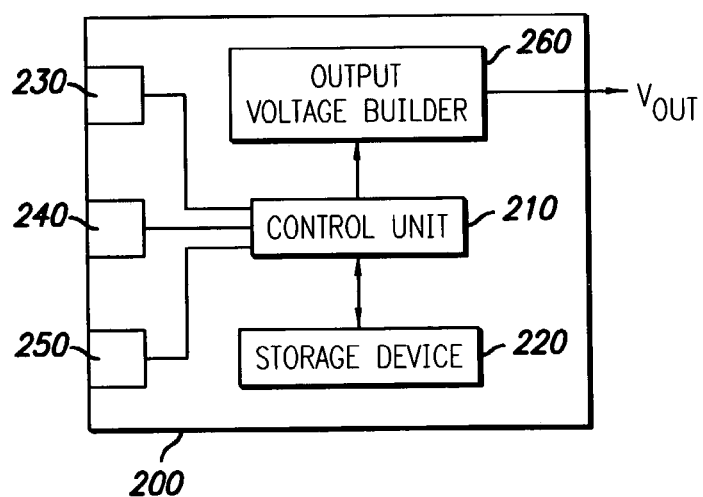
FIG. 2 depicts one embodiment of the programmable power converter provided by the present invention.

FIG. 2 illustrates a programmable power converter 200 operating in accordance with one embodiment of the present invention. Specifically, the power converter 200 includes an output voltage builder 260, control unit 210, a digital data serial interface ("serial interface") 230, a digital data parallel interface ("parallel interface") 250, and an analog data interface ("analog interface") 240. In a preferred embodiment of the present invention, the control unit 210 is adapted to determine an output voltage based upon a set of programming voltage data received by at least one of the connected interfaces (e.g., 230, 240 and 250) and the output voltage builder 260 is adapted to produce the determined output voltage.

It should be appreciated that the programmable power converters depicted herein (e.g., 200) include, but are not limited to, point-of-load regulators, power-on-load regulators, DC/DC converters, voltage regulators, and all other programmable voltage regulating devices (including all single and multiple output devices) generally known to those skilled in the art. It should further be appreciated that the serial, parallel and analog interfaces depicted herein (e.g., 230, 250 and 240) are not limited to a particular type of interface, but instead include all devices (or combinations thereof) that are capable of receiving data in a particular format (e.g., serial, parallel, analog) and providing data (in any format) to the control unit 210 in response thereto. For example, an interface may include a communication bus (or wire(s)) capable of receiving, and transmitting to the control unit 210, a particular format of data. Alternatively, an interface may further include active and/or passive components capable of performing a particular operation on the received data (e.g., latching, buffering, amplifying, trimming, etc.), and providing data in response thereto to the control unit 210. It should further be appreciated that the output voltage builder depicted herein (e.g., 260) includes, but is not limited to, all voltage converting/trimming devices (or circuits) generally known to those skilled in the art. Thus, for example, a multi-stage output voltage builder (e.g., including a fixed or variable voltage reference, an error amplifier, a pulse width modulation controller, a power train, etc.) is within the spirit and scope of the present invention.

In one embodiment, the programmable power converter 200 may further include a storage device 220 for storing programming voltage data and/or look-up table data. For example, if the programming voltage data is received via the serial interface 230, it may be stored in the storage device 220 before it is used to determine the output voltage. Alternatively, if the programming voltage data is received via the parallel interface 230 and represents VID code data, then a look-up table, which could be stored in the storage device 220, is typically used to determine the output voltage. This is because the desired output voltage cannot be ascertained from the VID code value itself without using additional information (e.g., look-up table data). In other words, the VID code value and the look-up table enable the control unit 210 to determine the output voltage. It should be appreciated that the storage device 220 can be a long term or short term storage device, including, but not limited to, registers, RAM, ROM, EPROM, EEPROM, flash memory, and all other digital data storage devices generally known to those skilled in the art.

Figure 3:
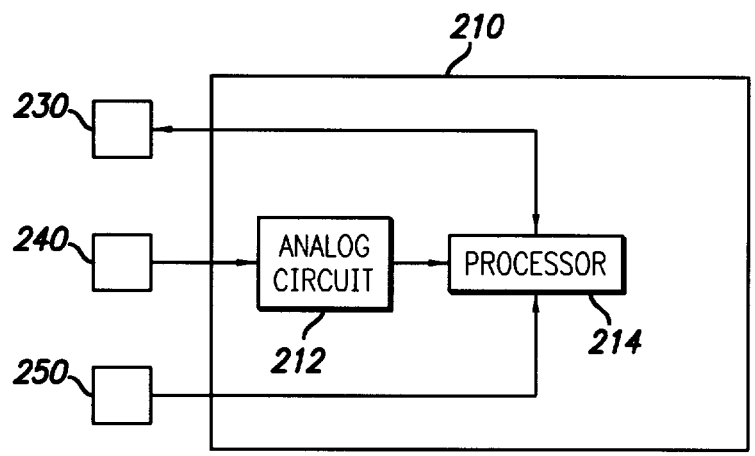
FIG. 3 illustrates one embodiment of the control unit depicted in FIG. 2.

In one embodiment of the present invention, as shown in FIG. 3, the control unit 210 further includes an analog circuit 212 and a processor 214. For example, digital data received via the serial and parallel interfaces 230, 250 may be provided (either directly or indirectly) to the processor 214 (e.g., to the processor's serial or parallel port). On the other hand, analog data received via the analog interface 240 may be provided to the analog circuit 212 for processing (e.g., digital conversion, amplifying, etc.) before it is provided to the processor 214. It should be appreciated, however, that the control unit 210 may not include an analog circuit if the analog processing (e.g., digital conversion, etc.) is performed by the analog interface 240. In this instance, the processed data would then be provided (either directly or indirectly) to the processor 214. It should also be appreciated that the processors depicted herein (e.g., 214) include, but are not limited to, application specific integrated circuits (ASICs), microprocessors, and all other computing devices generally known to those skilled in the art.

Figure 4:
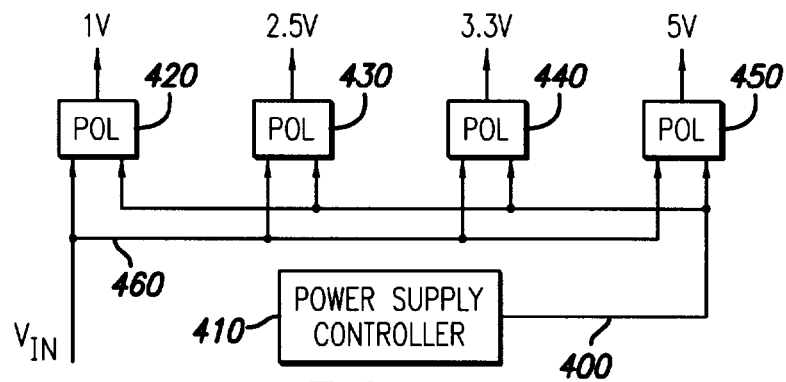
FIG. 4 depicts a programmable power control system operating in accordance with one embodiment of the present invention.

The programmable power converter 200 described herein is capable of being used in a variety of applications (i.e., in a programmable power converter system that includes an analog programming source, a parallel programming source, or a serial programming source). For example, FIG. 4 illustrates a power supply controller 410 communicating with a plurality of programmable power converters (i.e., 420, 430, 440 and 450) via a serial bus 400 to convert an input voltage 460 into a particular output voltage (e.g., 1V, 2.5V, etc.). Methods of using a serial bus to communicate with a programmable power converter, and providing programming voltage data (e.g., output voltage set-point data) over a serial bus are described in more detail in patent applications "SYSTEM AND METHOD FOR CONTROLLING A POINT-OF-LOAD REGULATOR" (Ser. No. 10/293,531) and "SYSTEM AND METHOD FOR COMMUNICATING WITH A VOLTAGE REGULATOR" (Ser. No. 10/293,001), respectively, and are incorporated by reference herein.

Figure 5:
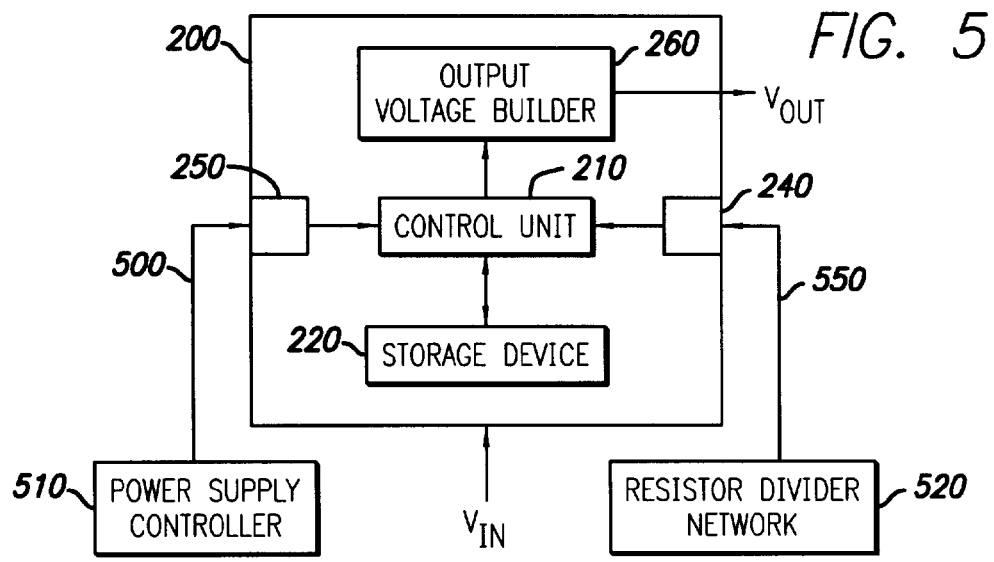
FIG. 5 depicts a programmable power control system operating in accordance with another embodiment of the present invention.

FIG. 5 illustrates how the parallel interface 250 can be used to facilitate communications between the programmable power converter 200 and a power supply controller 510 adapted to transmit digital data in a parallel format. Specifically, programming voltage data in a parallel format (e.g., VID code data) is provided to the programmable power converter 200 via a parallel bus 500 and the parallel interface 250. The programming voltage data (and possibly look-up table data) can then be used by the control unit 210 to determine an output voltage. The determined output voltage is then produced by the output voltage builder 260. It should be appreciated that the present invention is not limited to the use of a power supply controller to provide programming voltage data to the parallel interface 250. For example, hard wiring the parallel bus 500, such that fixed digital data in a parallel format is provided to the parallel interface 250, is within the spirit and scope of the present invention.

FIG. 5 also illustrates how the analog interface 240 can be used to facilitate communications between the programmable power converter 200 and a resistor network 520. Specifically, programming voltage data in an analog format (e.g., a voltage value between zero and five volts) is provided to the programmable power converter 200 via at least one wire 550 and the analog interface 240. The programming voltage data (or the processed result of the programming voltage data) can then be used by the control unit 210 to determine an output voltage. The determined output voltage is then produced by the output voltage builder 260. It should be appreciated that the resistor network depicted herein (i.e., 520) is not limited to a particular type of network. Thus, networks that include fixed-value components (e.g., resistors with fixed values) and/or at least one variable component (e.g., a potentiometer) are within the spirit and scope of the present invention.

Figure 6:
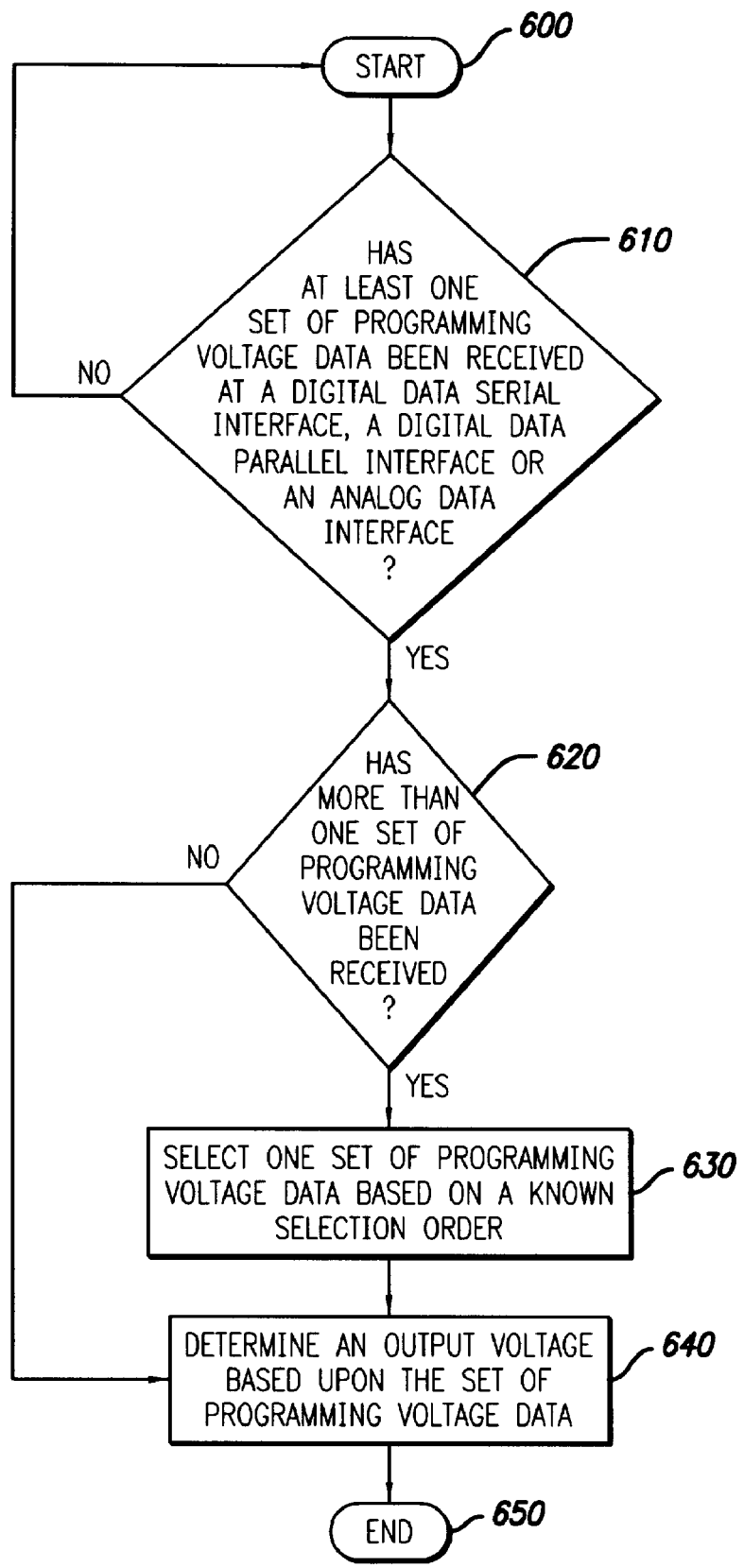
FIG. 6 is a flow chart depicting one method of determining an output voltage based upon a received set of programming voltage data.

One method of using the programmable voltage converter is illustrated in FIG. 6, starting at step 600. Specifically, at step 610, the power converter determines whether programming voltage data has been received at any one of the three interfaces. If programming voltage data has not been received, the process starts over at step 600. Alternatively, if programming voltage data has been received, the power converter, at step 620, determines whether more than one set of programming voltage data has been received. If only one set of programming voltage data has been received (e.g., via the analog interface), an output voltage based (at least in part) on the received set of programming voltage data is determined at step 640. Alternatively, if more than one set of programming voltage data has been received (e.g., via the serial interface and the parallel interface), one set of programming voltage data is then selected (or identified) at step 630. In one embodiment of the present invention, the programming voltage data is selected in accordance with a known priority level, or which data is understood to be more relevant. For example, data received by the serial interface may take priority (or be found more relevant) than data received by the parallel or analog interface. In this embodiment, data received by the serial interface would be selected (or identified) over data received by the parallel or analog interfaces. An output voltage based (at least in part) on the selected set of programming voltage data is determined at step 640, ending the process at step 650.

Having thus described a preferred embodiment of a system and method of determining the voltage output of a programmable power converter based on programming voltage data received from at least one of a variety of alternate sources, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A programmable power converter comprising:
   at least two interfaces including a digital interface and an analog interface;
   a control unit adapted to determine information relating to an output voltage in response to data received from at least one of said at least two interfaces; and
   an output voltage builder adapted to produce said output voltage;
   wherein the control unit comprises:
      circuitry adapted to receive analog voltage data and adapted to generate digital voltage data in response to the analog voltage data, the output voltage builder being adapted to use the digital voltage data to produce the output voltage; and,
      a digital processor adapted to provide control data to the output voltage builder.

2. The programmable power converter of claim 1, further comprising a storage device adapted to store data received from said digital interface.

3. The programmable power converter of claim 1, wherein the storage device comprises a serial interface.

4. The programmable power converter of claim 1, further comprising a storage device adapted to store look-up table data, said look-up table data being used by said control unit to determine said output voltage.

5. The programmable power converter of claim 1, further comprising at least one resistive device connected to said analog interface.

6. The programmable power converter of claim 1, wherein the output voltage builder comprises a pulse-width-modulation controller.

7. The programmable power convert of claim 1, wherein the digital interface comprises a communication bus interface.

8. The programmable power converter of claim 1, wherein the digital interface comprises a serial interface.

9. The programmable power converter of claim 1, wherein the digital interface comprises a parallel interface.

10. A programmable power converter system comprising:
    a programming apparatus; and
    a programmable power converter adapted to communicate with said programming apparatus, said programmable power converter comprising:
       at least two interfaces comprising a digital interface; and an analog interface;

a control unit adapted to determine information relating to an output voltage in response to data received from at least one of said digital interface, and said analog interface; and an output voltage builder adapted to produce said output voltage;

wherein the control unit comprises:

circuitry adapted to receive analog voltage data and adapted to generate digital voltage data in response to the analog voltage data, the output voltage builder being adapted to use the digital voltage data to produce the output voltage; and a digital processor adapted to provide control data to the output voltage builder.

11. The programmable power converter system of claim 10, wherein said programming apparatus comprises a processor.

12. The programmable power converter system of claim 10, further comprising a storage device adapted to store said data if said data is received from said digital interface.

13. The programmable power converter system of claim 12, wherein the storage device comprises a register.

14. The programmable power converter system of claim 10, further comprising a storage device adapted to store look-up table data, said look-up table data being used by said control unit to determine said output voltage.

15. The programmable power converter system of claim 10, further comprising at least one resistive device connected to said analog interface.

16. The programmable power converter system of claim 10, further comprising a serial bus over which the programmable power converter and the programming apparatus communicate.

17. The programmable power converter system of claim 10, wherein the output voltage builder comprises a pulse-width modulation controller.

18. The programmable power converter system of claim 10, wherein the digital interface comprises a communication bus interface.

19. The programmable power converter system of claim 10, wherein the digital interface comprises a serial interface.

20. The programmable power converter system of claim 10, wherein the digital interface comprises a parallel interface.

* * * * *